July 3, 1928.                    D. M. BROCKWAY                    1,676,072
                                 DELIVERY APPARATUS
                                 Filed Dec. 12, 1924
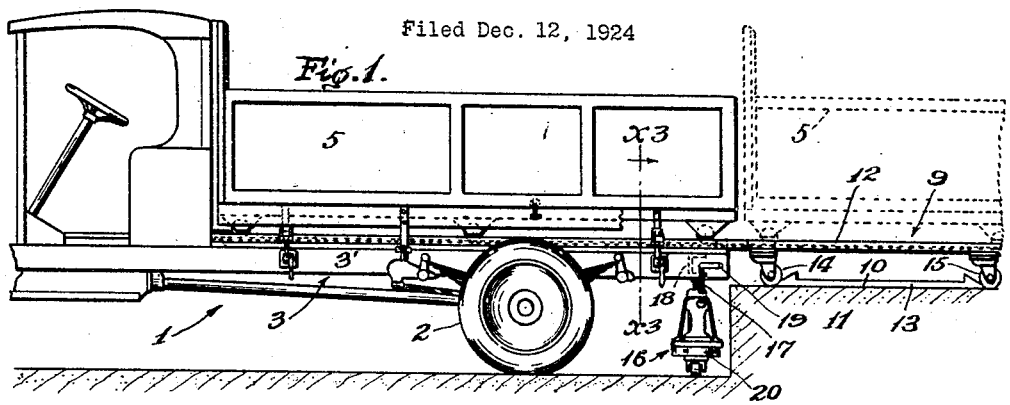
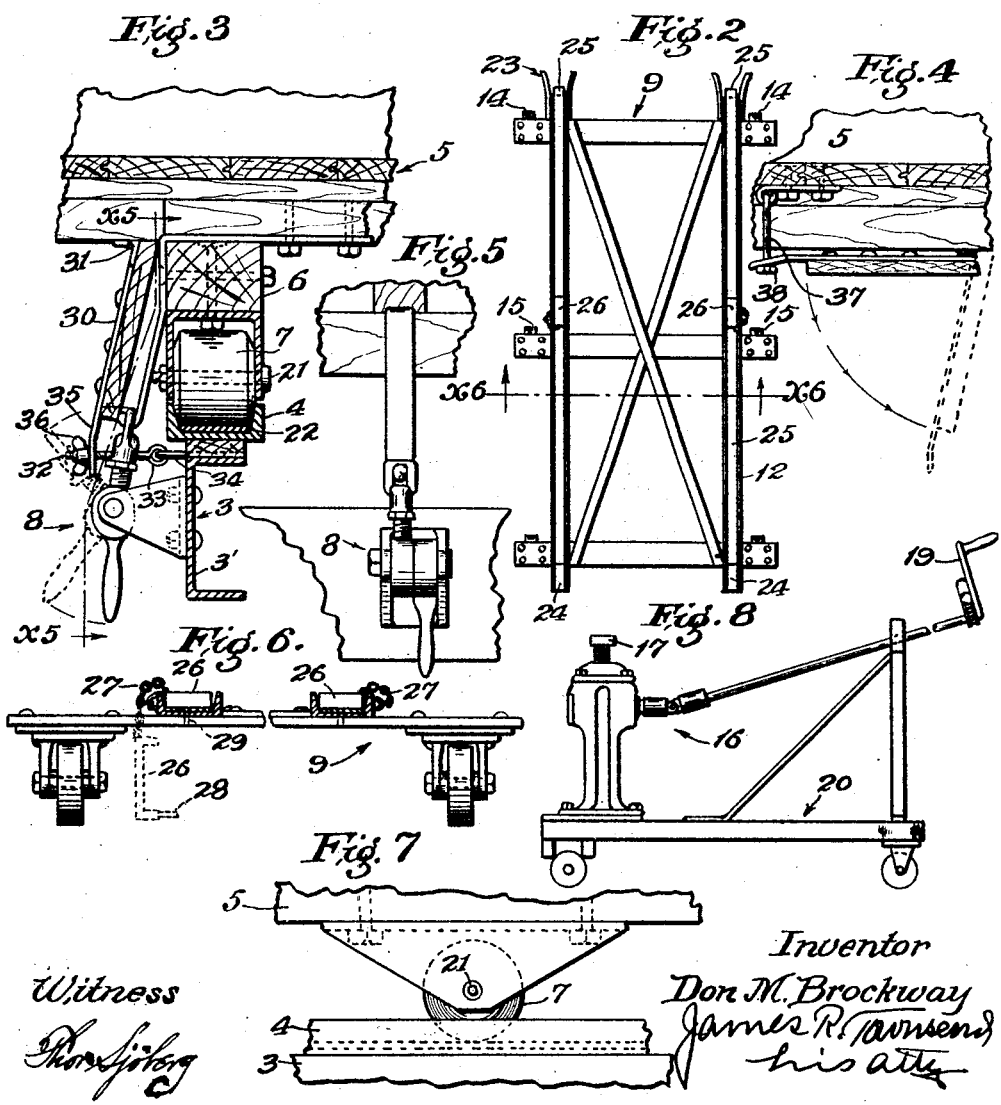
Witness
Thos Sjoberg
Inventor
Don M. Brockway
James R. Townsend
his atty Patented July 3, 1928.

1,676,072

UNITED STATES PATENT OFFICE.

DON M. BROCKWAY, OF LOS ANGELES, CALIFORNIA.

DELIVERY APPARATUS.

Application filed December 12, 1924. Serial No. 755,416.

The main object of this invention is to facilitate the delivery of goods from factory to warehouse and from warehouse to store.

Another object is to provide simple and convenient means for accomplishing the main object.

For security against injury of the truck load by jars occasioned by the travel of the truck, the truck is provided with springs that support the chassis and truck track, and the dolly is economically made without any springs for the reason that the dolly will normally have only a smooth factory or warehouse floor or other surface to run upon while the load is on the dolly; and the invention includes the combination with the truck chassis having a track and adapted to carry the carrier, of means to rigidly support the truck track to bring the same into practical alinement with the track of the dolly at the time of transferring the load from truck to dolly and vice versa.

The invention also includes the combination with the carrier and the truck having a track therefor, of a quick grip connection between the carrier and the truck so that during the period of transportation there will be no dislodgement of the carrier from the track of the truck.

Other objects, advantages and features of invention may appear from the accompanying drawing, the subjoined detailed description and the appended claim.

The invention may be understood by reference to the accompanying drawing.

Figure 1 is a fragmental view of a truck in position for delivery to a dolly on a platform. The dolly chock block is shown in position.

Fig. 2 is a plan of the dolly shown in Fig. 1.

Fig. 3 is a fragmental view on line $x^3$, Fig. 1, showing the truck bed or carrier secured on the truck track with the hinged side boards down and secured in place.

Fig. 4 is a fragmental view showing the side cover board swung up and secured in position for transferring the carrier to truck or dolly. Dotted lines indicate the position of the cover board when the carrier is secured to the truck.

Fig. 5 is a fragmental view showing in closed position, the quick grip device for securing the carrier to the truck.

Fig. 6 is a fragmental end view of the dolly in section on line $x^6$, Fig. 2.

Fig. 7 is an enlarged fragmental side elevation of one of the wheel supports for the carrier or truck body.

Fig. 8 is an elevation of the truck chassis stabilizer or truck chassis supporting means The truck 1 may be of any suitable character having wheels 2 and a spring supported chassis 3, which is provided with the usual parallel side rails 3' each of which has secured to its top a channel iron to form a longitudinal truck track 4. A carrier or truck body 5 having a frame 6 is provided with wheels 7 in fixed relation to the frame and adapted to run on said track 4.

Said chassis and truck body are provided with quick grip shackles 8 adapted to connect the truck body to the truck chassis when said truck body is fully run on the truck track. 9 is a carriage or dolly adapted to run on the floor 10, which is preferably the surface of a platform 11 or the factory, warehouse, or store floor. Said carriage has a track 12 adapted to be positioned at the end of the track 4 to form a continuation of the truck track 4.

13 is a double ended chock block to fit between and to chock companion fore and aft wheels 14 and 15 of the dolly to form a stabilizer for the carriage and prevent individual movement thereof when the body 5 is being transferred from the truck to the dolly or vice versa. 16 is a stabilizer for the chassis and has an adjustable screw 17 adapted to engage a cross-bar 18 of the chassis frame to support the rear end of the chassis for the purpose of holding the truck track and the carriage track in alinement for receiving or discharging the truck body from the truck chassis. The screw 17 may be elevated or lowered by the ratchet operating handle 19. The stabilizer 16 is mounted on a wheeled carriage 20 for convenience of positioning the same under the chassis frame.

The carriage wheels 14 and 15 are casters adapted to run freely in any direction when the chock block 13 is withdrawn from between fore and aft wheels on either side of the carriage and the truck body wheels revolve on axes 21 that are fixed transverse to the long axis of the body 5.

Preferably the truck track 4 is a grooved track made from a channel iron in which the inside faces of the walls converge downwardly and the sides of the wheels 7 are beveled so that the wheels of the truck carriage wedge into the grooves of the track sufficiently to prevent the truck body wheels from being loose relative to the chassis when the shackle 8 is drawn tight to fasten the carriage body to the truck chassis.

The grooved truck track 4 is provided with a spring steel wear-plate 22 which is securely fastened to the bottom of the channel irons of said track 4 to prevent the wheels 7 from wearing through the soft metal of the channel iron. This wear-plate 22 terminates about one inch from the rear end of the channel irons forming the truck chassis track 4.

The carriage or dolly track is provided at one end with outwardly diverging flanges 23 which are adapted to telescope the sides of and receive the truck track 4 and assist positioning the track of the carriage in alinement with the truck track. The other end of the dolly track is provided with blocks 24 to prevent the carriage 5 from running off the dolly track when the carriage is transferred from the truck track to the dolly track. The carriage track 12 is also provided with wear-plates 25 which extend about one inch from the ends of said tracks so that when the dolly track is positioned end to end with the truck track the extending end of the dolly track wear-plate will be received in the space left by terminating the wear-plate of the truck track short from the end thereof so that when the two tracks abut each other the wear-plates form an overlapping joint.

Carriage chock plates 26 are secured to the dolly frame by means of chassis 27 and said plates 26 are adapted to be positioned in the dolly track or to prevent endwise movement of the carrier or truck body 5 when it is transferred onto the dolly. The chock plates 26 are provided with a pin 28 which extends through an orifice 29 in the dolly track 12 to prevent movement of the chock plate relative to the dolly.

The truck body 5 is provided with a hinged side or covering board or plate 30 which is pivoted at 31 to the underside of the body 5 and is adapted to be secured in covering position when the truck body is on the truck track, and is also adapted to be raised and held out of the way to permit the truck body to be transferred from the truck track to the carriage 9.

The cover board is secured in covering position on the chassis by means of a bolt 32 which has an eye 33 connected to the chassis frame by a staple 34 and which bolt 32 is received in a slotted end of a strap 35 secured to the cover board 30. A wing-nut 36 is threaded on the bolt 32 and engages the strap 35 to hold the cover in covering position.

Bolts 37 pivotally connected to the underside of the truck body 5 are adapted to be received in the slotted end of the strap 35 when the cover board is raised out of covering position. A head 38 on the bolt 37 is adapted to engage the strap 35 when the bolt 37 is received in the slotted end of the strap 35 and hold the cover out of the way as shown in Fig. 4.

In operation the carriage 9 with the carrier 5 mounted thereon may be easily moved from place to place in the factory or warehouse, while the truck is being used for making deliveries, and the articles to be delivered may be loaded thereon in any suitable order.

Then when the truck arrives it is backed up to the loading platform and the stabilizer screw 17 is adjusted to engage the cross-bar 18 so that the spring supported chassis will not yield when the truck body is received on the truck track. (If the truck has a carrier thereon it will be first removed in an apparent manner).

The carriage and the carrier are then rolled into position so that the carriage track 12 is in alinement with the truck track 4 so that the ends of the tracks 4 and 12 abut each other. The chock block 13 is then positioned between the wheels 14 and 15 to prevent displacement of the dolly, and the chock blocks 26 are removed from the dolly track and then the truck body may be easily rolled onto the truck track. The quick grip shackles 8 are then clamped in place to secure the truck body to the truck frame.

The cover board 30 is then released from the bolt 37 and secured in covering position by the bolt 32 and wing-nut 36.

The cover board, when in covering position, covers the wheels 7 and a portion of the track 4 so that the space between the body 5 and the track 4 will not be visible from the side of the truck to passers-by, thereby providing a truck of this character which is very neat appearing.

I claim.

The delivery apparatus, comprising a wheel supported chassis, channel iron tracks on said chassis, a wheel supported body adapted to roll on said tracks, and onto said chassis, means to secure said body to said chassis, said means comprising quick grip shackles and shields, said shields being pivotally mounted on the underside of said body opposite the body wheels and depending therefrom to protect said shackle and wheels from the weather and means to secure in rigid position the free end of said shields.

In testimony whereof, I have hereunto set my hand at Los Angeles, California, this 28th day of November, 1924.

DON M. BROCKWAY.